United States Patent
Ginzburg et al.

(10) Patent No.: US 8,537,771 B2
(45) Date of Patent: *Sep. 17, 2013

(54) METHOD OF MULTIPLE-INPUT-MULTIPLE-OUTPUT WIRELESS COMMUNICATION

(75) Inventors: Boris Ginzburg, Haifa (IL); Shmuel Levy, Qiryat Tivon (IL)

(73) Assignee: Intel Corporation, Santa Clara, CA (US)

(*) Notice: Subject to any disclaimer, the term of this patent is extended or adjusted under 35 U.S.C. 154(b) by 916 days.

This patent is subject to a terminal disclaimer.

(21) Appl. No.: 12/212,875

(22) Filed: Sep. 18, 2008

(65) Prior Publication Data

US 2009/0010221 A1 Jan. 8, 2009

Related U.S. Application Data

(63) Continuation of application No. 10/734,120, filed on Dec. 15, 2003, now Pat. No. 7,443,818.

(51) Int. Cl.
*H04W 4/00* (2009.01)

(52) U.S. Cl.
USPC .................... 370/330; 370/342; 455/450

(58) Field of Classification Search
USPC ............. 370/328–334, 342–344, 436–437, 370/441, 465–466, 478–480; 455/450–451, 455/452.1, 452.2
See application file for complete search history.

(56) References Cited

U.S. PATENT DOCUMENTS

| | | | |
|---|---|---|---|
| 5,515,378 A | 5/1996 | Roy et al. | |
| 5,550,881 A | 8/1996 | Sridhar et al. | |
| 6,014,431 A | 1/2000 | McHale et al. | |
| 6,067,290 A | 5/2000 | Paulraj et al. | |
| 6,498,788 B1 | 12/2002 | Emilsson et al. | |
| 6,798,769 B1 | 9/2004 | Farmwald | |
| 6,870,808 B1 | 3/2005 | Liu et al. | |
| 6,954,655 B2 | 10/2005 | Rudrapatna et al. | |
| 7,072,315 B1* | 7/2006 | Liu et al. | 370/329 |
| 7,133,441 B1 | 11/2006 | Barlev et al. | |
| 7,142,864 B2* | 11/2006 | Laroia et al. | 455/450 |
| 7,443,818 B2* | 10/2008 | Ginzburg et al. | 370/330 |
| 7,492,749 B2* | 2/2009 | Song et al. | 370/342 |
| 7,577,118 B2* | 8/2009 | Haumonte et al. | 370/330 |
| 7,653,035 B2* | 1/2010 | Lin et al. | 370/338 |
| 7,653,415 B2* | 1/2010 | van Rooyen | 455/562.1 |
| 7,796,577 B2* | 9/2010 | Kim et al. | 370/343 |

(Continued)

FOREIGN PATENT DOCUMENTS

| | | |
|---|---|---|
| JP | 11-289278 | 10/1999 |
| JP | 2002-325049 | 11/2002 |

(Continued)

OTHER PUBLICATIONS

Japanese Office Action of Application No. P2006-545652 dated Nov. 2, 2009.

(Continued)

*Primary Examiner* — Kevin Mew

(74) *Attorney, Agent, or Firm* — Forefront IP Lawgroup, PLLC

(57) ABSTRACT

Embodiments of the present invention provide a method for selectively modulating a data frame of a signal using either a frequency-multiplexing modulation method or a spatial-multiplexing modulation method based on a predetermined criterion.

15 Claims, 3 Drawing Sheets

(56) References Cited

U.S. PATENT DOCUMENTS

| | | | |
|---|---|---|---|
| 8,345,535 B2* | 1/2013 | Lee et al. | 370/210 |
| 2002/0165626 A1 | 11/2002 | Hammons et al. | |
| 2003/0014763 A1 | 1/2003 | Chappell et al. | |
| 2004/0047306 A1 | 3/2004 | Katagishi et al. | |
| 2004/0105460 A1* | 6/2004 | Mogensen | 370/465 |
| 2004/0136349 A1* | 7/2004 | Walton et al. | 370/338 |
| 2004/0252632 A1* | 12/2004 | Bourdoux et al. | 370/210 |
| 2005/0041611 A1* | 2/2005 | Sandhu | 370/319 |
| 2005/0099975 A1* | 5/2005 | Catreux et al. | 370/329 |
| 2005/0259627 A1* | 11/2005 | Song et al. | 370/342 |
| 2009/0247187 A1* | 10/2009 | Feher | 455/456.1 |
| 2010/0119001 A1* | 5/2010 | Walton et al. | 375/260 |
| 2010/0119005 A1* | 5/2010 | Agrawal et al. | 375/267 |

FOREIGN PATENT DOCUMENTS

| | | |
|---|---|---|
| KR | 2003-0040057 | 5/2003 |
| WO | WO 02/33848 | 4/2002 |
| WO | 2005/062514 A2 | 7/2005 |
| WO | 2005/062514 A3 | 8/2005 |

OTHER PUBLICATIONS

Korean Office Action of Application No. 2006-7011755 dated Sep. 11, 2007.

P. W. Wolniansky, G. J. Foschini, G. D. Golden, R. A. Valenzuela. V-BLAST: An Architecture for Realizing Very High Data Rates Over the Rich-Scattering Wireless Channel Rich Scattering, Proc. URSI ISSSE, 295-300, Sep. 1998.

Asis Nasipuri, Jun Zhuang, Samir R. Das. A Multichannel CSMA MAC Protocol for Multihop Wireless Networks, Proceedings of IEEE Wireless Communications and Networking Conference (WCNC'99), pp. 1402-1406, Sep. 1999.

Shad, F. et al., "Dynamic Slot Allocation (DSA) in Indoor SDMA/TDMA Using a Smart Antenna Basestation", IEEE/ACM Transactions on Networking, IEEE Inc., New York, USA, vol. 9, No. 1, Feb. 1, 2001, pp. 69-81.

Spencer, Q.H. et al., Institute of Electrical and Electronics Engineers, "Capacity and downlink transmission algorithms for a multi-user mimo channel", Conference Record of the 36$^{th}$, Asilomar Conference on Signals, systems & Computers, Pacific Grove, CA, Nov. 3-6, 2002, Asilomar Conference on Signals, systems & Computers, New York, NY, IEEE, US, vol. 1 of 2, Conf. 36, Nov. 3, 2002, pp. 1384-1388.

International Search Report for PCT/US2004/038173, mailed on Apr. 27, 2005.

International Preliminary Report on Patentability and Written Opinion received for PCT Patent Application No. PCT/US2004/038173, mailed on Jun. 29, 2006, 11 pages.

Written Opinion received for Singapore Patent Application No. 200602411-1, mailed on Mar. 25, 2008, 6 pages.

Examination Report received for Singapore Patent Application No. 200602411-1, mailed on Jan. 28, 2009, 10 pages.

Office Action received for Japanese Patent Application No. 2006-545652, mailed on Feb. 9, 2009, 4 pages of English Translation and 4 pages of Japanese Office Action.

Office Action received for Japanese Patent Application No. 2006-545652, mailed on Apr. 26, 2010, 3 pages of English Translation and 3 pages of Japanese Office Action.

Office Action received for Korean Patent Application No. 10-2006-7011755, mailed on May 4, 2007, 2 pages of English Translation and 3 pages of Korean Office Action.

Office Action received for U.S. Appl. No. 10/734,120, mailed on May 21, 2007, 15 pages.

Office Action received for U.S. Appl. No. 10/734,120, mailed on Oct. 4, 2007, 13 pages.

Office Action received for U.S. Appl. No. 10/734,120, mailed on Mar. 13, 2007, 11 pages.

* cited by examiner

METHOD OF MULTIPLE-INPUT-MULTIPLE-OUTPUT WIRELESS COMMUNICATION

CROSS-REFERENCE TO RELATED APPLICATIONS

This application is a continuation of U.S. patent application Ser. No. 10/734,120, (U.S. Pat. No. 7,443,818) filed Dec. 15, 2003, which is hereby incorporated in its entirety.

BACKGROUND OF THE INVENTION

A Multiple-Input-Multiple-Output (NIMO) Space-Time-Coding (STC) wireless communication device may implement STC to multiplex data into a plurality of parallel data sequences. The STC device may also include a Space-Time (ST) encoder to encode the data sequences, and a ST decoder to decode received data. The encoded data sequences may be simultaneously transmitted by a plurality of antennas using one frequency channel.

A MIMO Multi-Channel (MC) wireless communication device may include a plurality of channel controllers associated with a plurality of Single-Input-Single-Output (SISO) encoders and a plurality of SISO decoders, respectively. Each of the channel controllers may be assigned to a different frequency channel. The MC device may simultaneously transmit and/or receive data over a plurality of different frequency channels.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
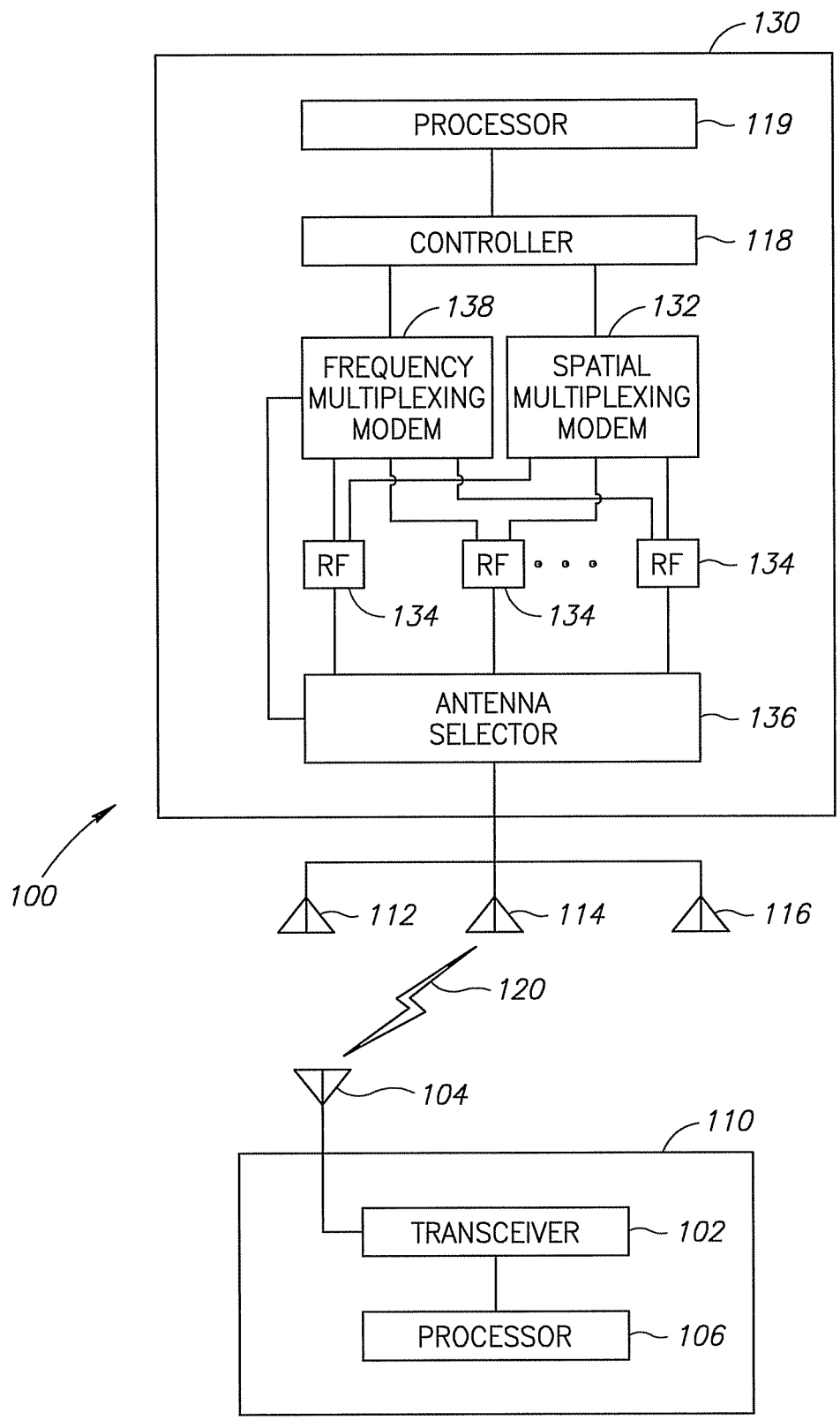
FIG. 1 is a schematic diagram of a wireless communication system in accordance with some exemplary embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Not withstanding any conventional meaning of the term "modem" (e.g., modulator-demodulator), in this application, unless specifically stated otherwise, the term "modem" may refer to a modulator, e.g., a device able to modulate data frames of signals to be transmitted and/or to a demodulator, e.g., a device able to demodulate data frames of received signals, and/or to a device able to both modulate and demodulate signals. Implementations of modems in accordance with embodiments of the invention may depend on specific applications and design requirements. Furthermore, modems in accordance with some embodiments of the invention may be implemented by separate modulator and demodulator units or in a single modulator/demodulator unit, and such units may be implemented using any suitable combination of hardware and/or software.

It should be understood that the present invention may be used in a variety of applications. Although the present invention is not limited in this respect, the circuits and techniques disclosed herein may be used in many apparatuses such as units of a wireless communication system, such as for example, a Wireless Local Area Network (WLAN) communication system and/or in any other unit and/or device. Units of a WLAN communication system intended to be included within the scope of the present invention include, by way of example only, modems, Mobile Units (MU), Access Points (AP), wireless transmitters/receivers, and the like.

Types of WLAN communication systems intended to be within the scope of the present invention include, although are not limited to, "IEEE-Std. 802.11, 1999 Edition (ISO/IEC 8802-11: 1999)" standard ("the 802.11 standard"), and more particularly in "IEEE-Std 802.11a-1999 Supplement to 802.11-1999: Wireless LAN MAC and PHY specifications: Higher speed Physical Layer (PHY) extension in the 5 GHz band", "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11g-2003 Supplement to 802.11-1999, Wireless LAN MAC and PHY specifications: Further Higher Data Rate Extension in the 2.4 GHz band, Draft 8.2", and "IEEE-Std 802.11k-2003 Supplement to 802.11-1999: Wireless LAN MAC and PHY specifications: Specification for Radio Resource Measurement, Draft 0.1", and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Reference is made to FIG. 1, which schematically illustrates a wireless communication system 100 in accordance with an embodiment of the present invention. It will be appreciated by those skilled in the art that the simplified components schematically illustrated in FIG. 1 are intended for demonstration purposes only, and that other components may be required for operation of the wireless systems, devices and methods described herein. Those of skill in the art will further note that the connection between components in the wireless devices described herein need not necessarily be as depicted in the schematic diagram of FIG. 1.

Communication system 100 may include wireless communication devices 130 and 110, which may communicate via a wireless link or channel 120 of wireless communication system 100. Although the scope of the present invention is not limited in this respect, communication devices 130 and 110 may include wireless modems of computers, and communication channel 120 may be part of a WAN or a LAN. For example, system 100 may be a WLAN system, a Wireless Personal Area Network (WPAN), or a Wireless Wide Area Network (WWAN).

Although the scope of the present invention is not limited in this respect, the exemplary communication system shown in FIG. 1 may be part of a wireless communication system, in which wireless device 130 is a remote unit (RU) and wireless unit 110 is an access point (AP). It will be recognized, however, that in some embodiments of the invention either or both communication devices 130 and 110 may be mobile stations, a personal digital assistant (PDA) and a server, respectively, access points, base stations, or any other device or combination of devices suitable for communicating within communication system 100.

Communication device 110 may include a transceiver 102, which may include a transmitter and/or a receiver in any suitable configuration. Transceiver 102 may include any suitable transmission and/or reception circuitry known in the art for receiving data transmitted, e.g., by device 130 and/or for transmitting data, e.g., to device 130, as described below. Transceiver 102 may be implemented, for example, in the form of a single unit or in the form of separate transmitter and receiver units using any suitable combination of hardware and/or software as is known in the art. For example, in the context of the embodiment described with reference to FIG. 1, transceiver unit 102 may operate to both transmit and receive signals.

Communication devices 130 and 110 may include one or more radio frequency antennas, as is known in the art. For example, device 110 may include an antenna 104 associated with transceiver 102, and device 130 may include a plurality of antennas, for example, antennas 112, 114, and 116. Although the scope of the present invention is not limited in this respect, types of antennae that may be used for antenna 104, antenna 112, antenna 114, and/or antenna 116 may include but are not limited to internal antenna, dipole antenna, omni-directional antenna, a monopole antenna, an end fed antenna, a circularly polarized antenna, a micro-strip antenna, a diversity antenna and the like.

Wireless device 110 may include a processor 106, which may be associated with a memory (not shown). Processor 106 may process data packets of signals received by transceiver 102 and/or data packets of signals intended for transmission by transceiver 102. Wireless device 130 may include a processor 119 associated with a memory (not shown), and a controller 118. Controller 118 may be able to control the flow of data to/from processor 119 and to selectively provide to either a frequency-multiplexing modem 138 or a spatial-multiplexing modem 132 a data frame to be transmitted, as described in detail below.

According to exemplary embodiments of the invention, modem 138 may be able to modulate data to be transmitted and/or demodulate received data based on a Multiple-Input-Multiple-Output (MIMO) frequency multiplexing method, i.e., a MIMO multiplexing method using in parallel a plurality of channels separated in frequency, as is known in the art. For example, modem 138 may implement a MIMO Multi-channel (MC) multiplexing method, as is known in the art.

According to exemplary embodiments of the invention, modem 132 may be able to modulate data to be transmitted and/or to demodulate received data based on a MIMO spatial-multiplexing method, i.e., a MIMO multiplexing method simultaneously using a plurality of spatial channels of one frequency, as is known in the art. For example, modem 132 may implement a Space-Time Coding (STC) algorithm, a Space Division Multiplexing (SDM) method, or any other spatial-multiplexing method, as are known in the art.

According to exemplary embodiments of the invention, wireless device 100 may also include a plurality of Radio Frequency (RF) paths 134 associated with modem 138 and modem 132. Paths 134 may be adapted to transmit and receive data via antennas 112, 114, and 116, as is known in the art.

According to exemplary embodiments of the invention, controller 118 may selectively transfer data to be transmitted, e.g., provided by processor 119, either to modem 138 or to modem 132, based on a predetermined criterion, as described below. The data may be modulated by the selected modem, and transferred via one or more of paths 134 to an antenna selector 136. Modem 130 may also control antenna selector 136 to select one or more of antennas 112, 114 and 116, e.g., according to one or more frequency channels implemented by the frequency-multiplexing method, e.g., as is known in the art. Data received from one or more of channels 134, e.g., via one or more of antennas 112, 114, and 116, may be demodulated by either modem 138 or modem 132. For example, data previously modulated according to the STC method may be demodulated by modem 132, and data previously modulated according to the MC method may be demodulated by modem 138, e.g., as described below. The demodulated data may be transferred by controller 118 to processor 119, e.g., as described below.

It will be noted that wireless device 130 may be implemented by different architectures, as are known in the art. For example, one or more elements of device 130, e.g., processor 119, controller 118, modem 132, modem 138, paths 134 and/or antenna selector 136, may be implemented using any suitable combination of hardware and/or software, and may include any circuit, circuitry, unit or combination of integrated and/or separate units or circuits, as are known in the art, to perform desired functionalities. It is noted that the terms "circuit" and "circuitry" as used herein, may include any suitable combination of hardware components and/or software components, e.g., as described below.

Figure 2:
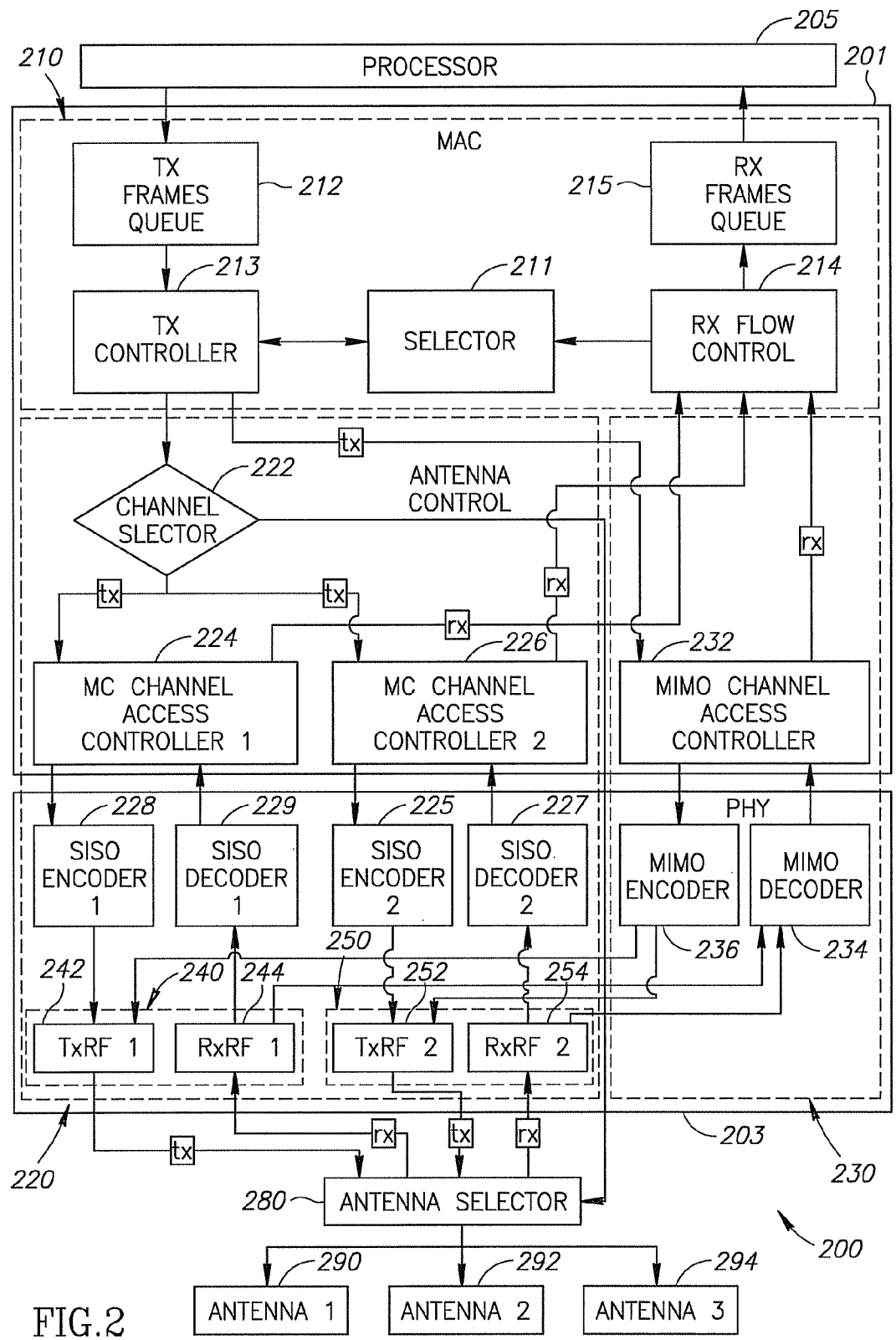
FIG. 2 is a schematic illustration of a dual-channel wireless device in accordance with some exemplary embodiments of the invention.

Reference is made to FIG. 2, which schematically illustrates a dual-channel wireless device 200 in accordance with some exemplary embodiments of the invention.

According to some exemplary embodiments of the invention, device 200 may be capable of receiving and/or transmitting data using either a STC modem or a dual-channel modem, as described below.

According to exemplary embodiments of the invention, device 200 may include a processor 205 associated with a controller 210, as described in detail below. Device 200 may also include a dual channel modem 220 and a STC modem 230 associated with controller 210, respectively, as described below. Device 200 may also include a first RF path 240 and a second RF path 250, each associated with modem 220 and modem 230. Path 240 and path 250 may transmit and/or receive data to/from a plurality of antennas, e.g., antennas 290, 292 and 294, via an antenna selection module 280, as is known in the art. Path 240 and path 250 may include any suitable RF path for transmitting and/or receiving data through a channel, as is known in the art. For example, path 240 may include a transmission (Tx) sub-module 242 and a Receiving (Rx) sub-module 244, and path 250 may include a Tx sub-module 252 and a Rx sub-module 254, as are known in the art.

According to exemplary embodiments of the invention, modem 220 may include any suitable dual-channel modem for modulating data to be transmitted and/or demodulating received data according to a MC multiplexing method. For example, modem 220 may include a channel selection module 222, e.g., as is known in the art, to select a frequency channel for transmitting data provided from controller 210. For example, the frequency channel may be selected based on a physical-carrier sensing mechanism or a virtual-carrier sensing mechanism, as are defined by the 802.11 standard.

Module 222 may transfer the data from controller 210 to a first MC-based channel access control module 224 or to a second MC-based channel access control module 226, e.g., based on the selected frequency channel. Each of modules 224 and 226 may be adapted to control transmission of the data via an individual frequency channel, e.g., using one or more of antennas 290, 292 and 294, as is known in the art.

Module 222 may also be adapted to control antenna selection module 280 according to one or more frequency channels implemented by the MC multiplexing method, as is known in the art. For example, module 222 may control selector 280 to assign one or more of antennas 290, 292 and 294 for receiving data, e.g., via path 240, and to assign one or more of antennas 290, 292 and 294 for transmitting data, e.g., via path 250.

Module 224 may be associated with a first Single-Input-Single-Output (SISO) encoding module 228 and a first SISO decoding module 229, and module 226 may be associated with a second SISO encoding module 225 and a second SISO decoding module 227. Modules 228 and 225 may include any suitable SISO encoding modules, e.g., as are known in the art, adapted to encode the data to be transmitted via paths 240 and 250, respectively. Modules 229 and 227 may include any suitable SISO decoding modules, e.g., as are known in the art, adapted to decode data received via paths 240 and 250, respectively. Path 240 and/or path 250 may be assigned individually to a channel, e.g., by module 224 and/or module 226, such that a data-frame may be transmitted through one of paths 240 and 250. At least some of antennas 290, 292 and 294 may be controllably assigned, e.g., by module 222, to path 240 or path 250. Thus, modem 220 may be implemented, for example, to transmit and/or receive data over two frequency channels in parallel, e.g., in full duplex. Module 224 and module 226 may also be adapted to check for an acknowledgment (ACK) frame corresponding to the data-frame transmitted, and transfer to module 222 a signal corresponding to whether an ACK frame was received or not, as is known in the art. Module 224 and module 226 may also be adapted to send an ACK frame corresponding to each data-frame received without errors, as is known in the art.

According to exemplary embodiments of the invention, modem 230 may include any suitable modem for modulating data to be transmitted and/or demodulating received data according to a STC multiplexing method. For example, modem 230 may include a STC-based channel access control module 232 adapted to control simultaneous transmission via paths 240 and 250 of the data received from controller 210, e.g., using one frequency channel, as is known in the art.

Module 232 may also be capable of multiplexing the data to be transmitted, e.g., to provide two parallel sequences to be simultaneously transmitted via paths 240 and 250, respectively. Module 232 may be associated with a MIMO encoding module 236 and a MIMO decoding module 234. Module 236 may include any suitable MIMO encoding module, e.g., as is known in the art, adapted to encode the two data sequences provided from module 232. Module 234 may include any suitable MIMO decoding module, e.g., as is known in the art, adapted to decode data received simultaneously via paths 240 and 250. Module 232 may also be capable of demultiplexing decoded data provided from module 234, as is known in the art. Thus, modem 230 may be implemented to transmit or receive a data-frame via one channel on both path 240 and path 250 simultaneously.

Module 232 may also be adapted to check if an ACK frame, corresponding to the data-frame transmitted, is received, as is known in the art. Module 232 may also be adapted to send an ACK frame corresponding to each data-frame correctly received, as is known in the art.

According to exemplary embodiments of the invention, controller 210 may include a selection module 211 to select between either frequency-multiplexing modulation method, which may be implemented using modem 220, or spatial-multiplexing modulation method, which may be may be implemented by modem 230, based on the predetermined criterion, as described in detail below.

According to exemplary embodiments of the invention, controller 210 may also include a Tx frame queue module 212 able to buffer data provided from processor 205, as is known in the art. Controller 210 may also include a Tx control module 213 associated with queue module 212 and selection module 211. Queue module 212 may provide Module 213 with a data-frame, e.g., when a channel is available for transmission. Module 213 may selectively transfer the data-frame to either module 222 or module 232, in accordance with the modulation method selected by module 211. If, for example, the frequency-multiplexing modulation method is selected by module 211, module 213 may transfer the data-frame to module 222. Conversely, if the spatial-multiplexing modulation method is selected by module 211, module 213 may transfer the data-frame to module 232. Module 222 or module 232 may provide Tx control module 213 with a signal corresponding to whether an ACK frame corresponding to a transmitted data frame was received. If an ACK frame was not received, Tx control module may be able to re-send the data-frame through a different channel, as is known in the art.

According to exemplary embodiments of the invention, controller 210 may also include an Rx flow control module 214 to transfer demodulated data provided from module 226, module 232 and/or module 224 to a Rx frame queue module 215, as is known in the art. Module 215 may be able to buffer the data provided from module 214 and to transfer the buffered data to processor 205, as is known in the art.

According to some exemplary embodiments of the invention, it may be required to provide device 200 with information identifying the modulation method, e.g., the frequency-multiplexing modulation method or the spatial-multiplexing method, used for modulating a data-frame to be received by device 200. This may be performed, for example, by transmitting to device 200, e.g., before switching between multiplexing methods, a training sequence including information corresponding to the selected multiplexing method.

According to other embodiments of the invention, it may not be required to inform device 200 of the multiplexing method used for modulating the data. In such other embodiments, device 200 may be adapted to detect the multiplexing method used to modulate the received data. For example, modules 229 and 227 may be capable of decoding only data-frames previously encoded according to the MC multiplexing method, and module 234 may be capable to decode only data-frames previously encoded according to the STC multiplexing method.

Although the above discussion refers to a dual-channel wireless communication device, e.g., device 200, it will be appreciated by those skilled in the art that device 200 may be modified to implement a communication device of n channels, for example, by replacing paths 240 and 250 with n RF paths, by modifying modem 230 to implement an n-channel STC-based multiplexing method, and by replacing modem 220 with a suitable n-channel modem, e.g., including n MC channel access control modules, n SISO encoding modules and n SISO decoding modules.

According to some embodiments of the invention, module 211 may select either the frequency-multiplexing modulation method or the spatial-multiplexing modulation method based on a channel quality value. For example, the channel quality may be evaluated based on data provided to module 211 from module 214 and/or module 213, as described below.

According to some exemplary embodiments of the invention, the channel quality may be evaluated in relation to the number of data-frames that are transmitted by device 200 compared to the number of such data-frames that are acknowledged by, for example, an ACK frame, as described above. The channel quality value may be expressed in terms of a percentage, for example, a Packet Error Rate (PER) percentage, which may be, for example, the number of data-frames for which an ACK frame has not been received, over the number of data-frames transmitted in a particular period. In some embodiments, a success/fail rate of transmitted data-frames may be measured or calculated over an interval of, for example, a most recent group of data-frames that were transmitted, for example, the last 100 or 1000 data-frames transmitted, if desired. In other embodiments, a success/fail rate or a PER may be calculated over a given time period. Thus, for example, module 211 may evaluate the channel quality based on the PER percentage, e.g., related to previously transmitted data-frames. Other measures or periods of calculations may be used.

According to some embodiments of the invention, the channel quality may be expressed in terms of Cyclic Redundancy Check (CRC) error percentage, which may be, for example, the number of data-frames received, e.g., by module 214, with an incorrect CRC, over the number of data-frames received in a particular period. Thus, for example, module 211 may evaluate the channel quality based on the CRC error percentage, e.g., related to previously received data-frames.

According to some exemplary embodiments of the invention, one or more frames received by module 214 may include quality related information, e.g., as defined by the 802.11k standard. For example, if open loop signaling is implemented, e.g., as defined by the 802.11k standard, the quality related information may be part of a preamble of a received data-frame. Additionally or alternatively, for example, if closed loop signaling is implemented, e.g., as defined by the 802.11k standard, the quality related information may be part of a received management frame.

According to other exemplary embodiments of the invention, a predetermined training sequence may be received by device 200, e.g., at a predetermined time interval, as is known in the art. Module 211 may evaluate the channel quality based on the training sequence as received by device 200. For example, module 211 may evaluate the channel quality based on a comparison of the training sequence as provided from module 214 and the predetermined training sequence.

According to some embodiments of the invention, module 211 may select either the frequency-multiplexing modulation method, e.g., as may be implemented by modem 220, or the spatial-multiplexing modulation method, e.g., as may be implemented by modem 230, based on the channel quality value. Thus, for example, the data frame may be selectively modulated using either the frequency-multiplexing modulation method or the spatial-multiplexing modulation method based on the predetermined criterion. The selection may be performed using any suitable selection method, e.g., as described below.

Figure 3:
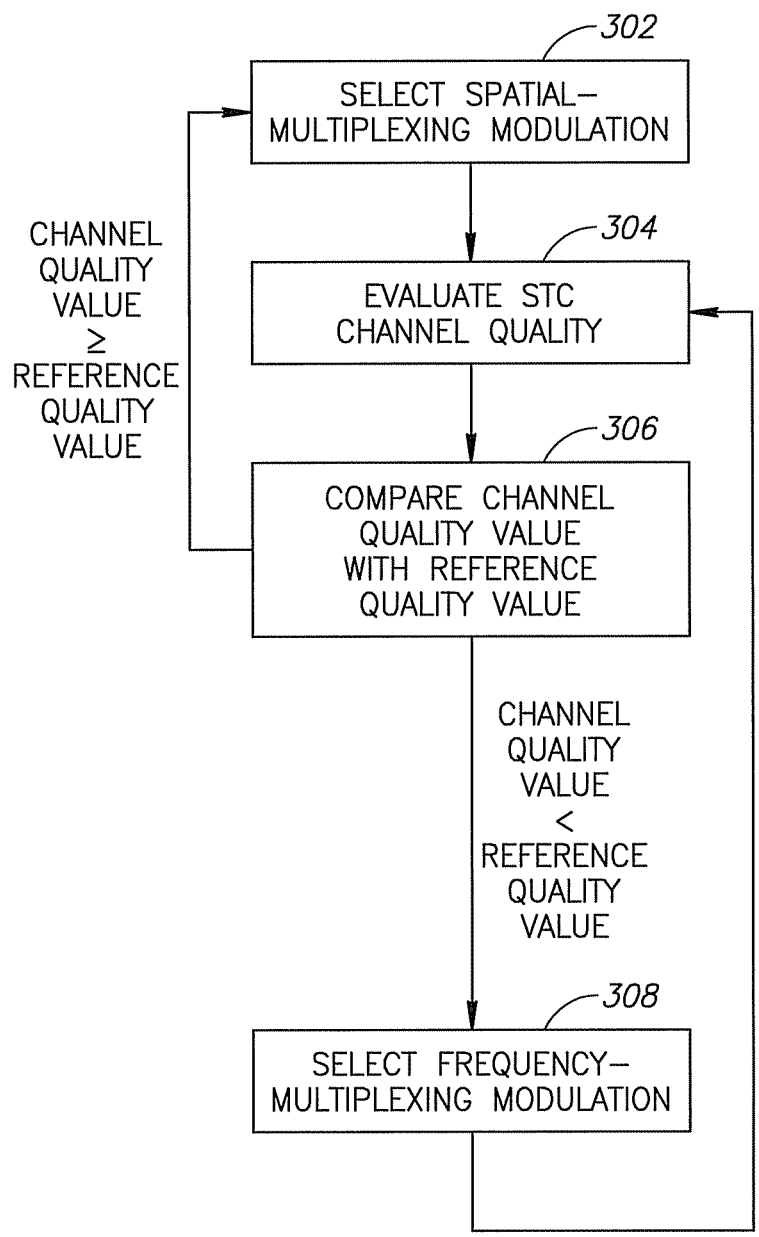
FIG. 3 is a schematic illustration of a flow chart of a method of controllably selecting between a spatial-multiplexing modulation method and a frequency-multiplexing modulation method in accordance with some exemplary embodiments of the invention.

Reference is made to FIG. 3, which schematically illustrates a flow chart of a method of controllably selecting between the spatial-multiplexing modulation method and the frequency-multiplexing modulation method in accordance with an exemplary embodiment of the invention.

As indicated at block 302, the method may include selecting a pre-determined modulation method, e.g., the spatial-multiplexing modulation method.

As indicated at block 304, the channel quality corresponding to a channel estimation related to the pre-determined modulation method may be evaluated, and a channel quality value corresponding to a channel estimation related to the predetermined modulation method may be provided, e.g., as described above.

According to some exemplary embodiments, the channel quality may be evaluated at a predetermined time interval. For example, the channel quality may be evaluated during a channel scanning process, as is known in the art.

As indicated at block 306, the method may include comparing the channel quality value to a predetermined reference quality value, e.g., a minimum quality value. A modulation method may be selected based on the comparison between the channel quality value and the reference quality value. For example, the predetermined modulation method, e.g., the spatial-multiplexing modulation method, may be selected if the channel quality value is at least equal to the reference quality value.

As indicated at block 308, the frequency-multiplexing modulation method may be selected if the channel quality value is less than the reference quality value. The channel quality value corresponding to the predetermined modulation method may be re-evaluated periodically, e.g., according to the predetermined time interval, and compared to the reference quality value, as indicated at block 304.

Thus, according to this exemplary embodiment, the spatial-multiplexing modulation method may be selected, e.g., by module 211 (FIG. 2), if the channel quality value corresponding to the spatial-multiplexing modulation method is at least equal to the reference quality value. The frequency-multiplexing modulation method may be selected, e.g., by module 211 (FIG. 2), if the channel quality is less than the reference quality value.

It will be appreciated by those skilled in the art that the device system and/or method, according to embodiments of the invention, may be implemented to achieve a relatively stable and relatively high throughput in an open environment, i.e., an environment characterized by relatively low multi-path effects, as well as in a closed environment, i.e., an environment characterized by relatively high multi-path effects. This may be achieved, for example, by selectively switching between the spatial-multiplexing modem and the frequency-multiplexing modem, as described above.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
   selecting either a multi-channel modem of a communication device or a spatial-multiplexing modem of the communication device to modulate a data-frame of a signal based on a predetermined criterion;
   modulating the data-frame of the signal by a frequency-multiplexing modulation method if the multi-channel modem is selected; and
   modulating the data-frame of the signal by a spatial-multiplexing modulation method if the spatial-multiplexing modem is selected.

2. The method of claim 1, wherein said selecting comprises evaluating a channel quality value corresponding to a channel estimation related to a predetermined modulation method of said spatial-multiplexing modulation method and said frequency-multiplexing modulation method.

3. The method of claim 2, wherein said selecting comprises comparing said channel quality value with a predetermined reference quality value.

4. The method of claim 3, wherein said reference quality value comprises a minimum quality value.

5. The method of claim 1, wherein said modulating by the frequency-multiplexing modulation method comprises:
   assigning a plurality of channel access control modules to a plurality of individual frequency channels, respectively; and
   modulating by a plurality of single-input-single-output encoding modules data provided by the plurality of channel access control modules, respectively.

6. The method of claim 5, wherein said modulating by the frequency-multiplexing modulation method comprises:
   associating the plurality of channel access control modules to a plurality of single-input-single-output decoding modules, respectively; and
   demodulating data received from a plurality of radio frequency paths.

7. The method of claim 5, wherein said modulating by the frequency-multiplexing modulation method comprises:
   multiplexing a data-frame of a signal to be transmitted into a plurality of parallel sequences by a multiple-input-multiple-output channel access control module;
   encoding the parallel sequences by a multiple-input-multiple-output encoding module; and
   transmitting the encoded sequences via a plurality of radio frequency paths.

8. The method of claim 2, wherein said channel quality value is related to one or more data frames received or transmitted by the communication device.

9. An article comprising a non-transitory computer-storage medium having stored thereon instructions that when executed by a processing platform, result in:
   selecting either a multi-channel modem of a communication device or a spatial-multiplexing modem of the communication device to modulate a data-frame of a signal based on a predetermined criterion;
   modulating the data-frame of the signal by a frequency-multiplexing modulation method if the multi-channel modem is selected; and
   modulating the data-frame of the signal by a spatial-multiplexing modulation method if the spatial-multiplexing modem is selected.

10. The article of claim 9, wherein the instructions when executed further result in:
    evaluating a channel quality value corresponding to a channel estimation related to a predetermined modulation method of said spatial-multiplexing modulation method and said frequency-multiplexing modulation method.

11. The article of claim 9, wherein the instructions when executed further result in:
    comparing said channel quality value with a predetermined reference quality value.

12. The article of claim 11, wherein the reference quality value comprises a minimum quality value.

13. The article of claim 9, wherein the instructions that when executed result in modulating by the frequency-multiplexing modulation, further results in:
    assigning a plurality of channel access control modules to a plurality of individual frequency channels, respectively; and
    modulating data provided by the plurality of channel access control modules by a plurality of single-input-single-output encoding modules, respectively.

14. The article of claim 13, wherein the instructions when executed further result in:
    associating the plurality of channel access control modules to a plurality of single-input-single-output decoding modules, respectively; and
    demodulating data received from a plurality of radio frequency paths.

15. The article of claim 9, wherein the instructions that when executed result in modulating by the spatial-multiplexing modulation method, further results in:
    multiplexing a data-frame of a signal to be transmitted into a plurality of parallel sequences by a multiple-input-multiple-output channel access control module;
    encoding the parallel sequences by a multiple-input-multiple-output encoding module; and
    transmitting the encoded sequences via a plurality of radio frequency paths.

* * * * *